United States Patent [19]

Nagano

[11] Patent Number: 4,602,708
[45] Date of Patent: Jul. 29, 1986

[54] CLUTCH COVER ASSEMBLY

[75] Inventor: Tamio Nagano, Hirakata, Japan

[73] Assignee: Kabushiki Kaisha Daikin Seisakusho, Neyagawa, Japan

[21] Appl. No.: 739,502

[22] Filed: May 30, 1985

Related U.S. Application Data

[63] Continuation of Ser. No. 484,875, Apr. 14, 1983, abandoned.

[30] Foreign Application Priority Data

Apr. 15, 1982 [JP] Japan .............................. 57-55043[U]

[51] Int. Cl.⁴ .............................................. F16D 13/50
[52] U.S. Cl. .................................. 192/70.27; 192/89 B
[58] Field of Search ................ 192/89 B, 70.27, 70.28, 192/70.29, 70.3, 99.5

[56] References Cited

U.S. PATENT DOCUMENTS

| | | | |
|---|---|---|---|
| 2,003,324 | 6/1935 | Vail | 192/70.27 |
| 2,325,193 | 7/1943 | Nutt et al. | 192/70.27 |
| 2,407,728 | 9/1946 | Spase | 192/70.29 |
| 3,017,003 | 1/1962 | Reed | 192/70.27 |
| 3,167,162 | 1/1965 | Cook | 192/70.27 |
| 3,323,624 | 6/1967 | Maurice | 192/89 B |
| 3,707,211 | 12/1972 | Kuno | 192/89 B |
| 3,791,499 | 2/1974 | Ryan | 192/70.27 |
| 3,811,544 | 5/1974 | Maucher | 192/89 B |
| 3,939,951 | 2/1976 | Sink et al. | 192/89 B |
| 4,184,578 | 1/1980 | Moore et al. | 192/89 B |
| 4,326,611 | 4/1982 | Billet | 192/89 B |
| 4,399,897 | 8/1983 | Billet et al. | 192/89 B |
| 4,420,070 | 12/1983 | Maucher et al. | 192/89 B |

FOREIGN PATENT DOCUMENTS 2029334 12/1971 Fed. Rep. of Germany .

Primary Examiner—Rodney H. Bonck
Assistant Examiner—Alan G. Towner
Attorney, Agent, or Firm—Armstrong, Nikaido, Marmelstein & Kubovcik

[57] ABSTRACT

A clutch cover assembly comprising a clutch cover; a diaphragm spring supported by fulcrum means of the clutch cover for forcing a pressure plate; and Belleville spring means disposed between the diaphragm spring and spring seat means of the clutch cover, so that the Belleville spring means may force and compress the diaphragm spring. The Belleville spring means may be disposed radially inside and/or outside the fulcrum means. The Belleville spring means may comprises plural thicknesses of Belleville springs.

8 Claims, 8 Drawing Figures

CLUTCH COVER ASSEMBLY

This application is a continuation of application Ser. No. 484,875 filed Apr. 14, 1983 now abandoned.

BACKGROUND OF THE INVENTION

The present invention relates to a clutch cover assembly suitable for the clutches of automobiles, in which a diaphragm spring is supported by a clutch cover.

The structure shown in FIG. 1 has been known as a coventional clutch cover assembly. In FIG. 1, a clutch cover 2 is secured to a flywheel 1. Stud pins 3 (only one is illustrated) fixed to the cover 2 support diaphragm spring 5 through a pair of wire rings 4 and 4'. Outer radial end portion 5a of the diaphragm spring 5 is in contact with a pressure plate 7 which is operable to press a friction facing of a clutch disc 6 to the flywheel 1. Torque is transmitted from the flywheel 1 through the clutch disc 6 clamped between the flywheel 1 and the pressure plate 7 to a driven shaft (not shown).

The diaphragm spring 5 is designed to have long durability that its load characteristic may change as shown by solid line A in FIG. 2 with respect to its compressed length. Diaphragm spring 5 is generally designed and assembled to have a compressed length at a point B when the clutch is engaged during initial use (i.e., when the clutch is new). However, the facing of the clutch disc 6 wears with long use, which reduces the compressed length of the spring 5 when in the clutch engaged position, so that the load gradually increases to a point C in FIG. 2. Further wear of the facing causes gradual reduction of the load and reduces the length to a wear limit point D on line A. As stated above, the pressing force (load) of the spring 5 increases above the desirable value over long use, especially at about the point C, so that remarkably large and excess torque may be transmitted from the driving flywheel 1 to the driven clutch disc 6. Therefore a transmission mechanism and a differential mechanism of the vehicle must have strength sufficient to bear the excess torque, so that it is impossible to sufficiently reduce the weight of the transmission mechanism and the differential mechanism. Although lightening of the automobile is desirable, the above noted factors prevent lightening of the vehicle. Further, the above described load change causes deteriorating operating feel because pedal force for the clutch pedal becomes heavy when the facing wears to some extent.

Accordingly, it is an object of the invention to provide an improved clutch cover assembly, overcoming the above-noted disadvantages.

The essence of the present invention it to provide a Belleville spring for forcing a diaphragm spring in the compressing direction of the diaphragm spring.

Other and further objects, features and advantages of the invention will appear more fully from the following description of the preferred embodiments of the invention.

DETAILED DESCRIPTION OF THE PREFERRED EMBODIMENTS

Figure 1:
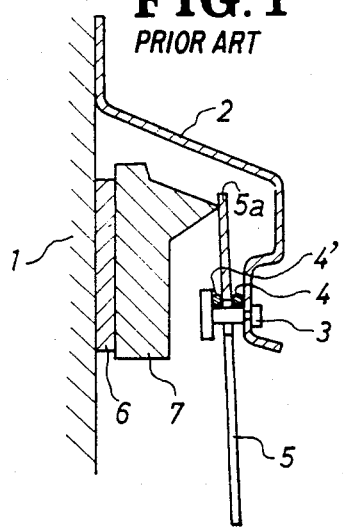
FIG. 1 is a partial schematic sectional view of a conventional clutch cover assembly.
Figure 3:
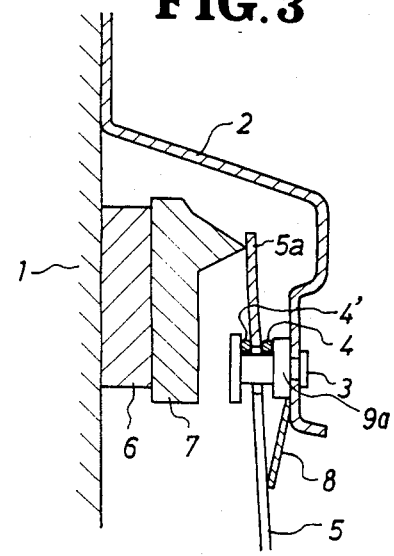
FIG. 3 is a partial schematic sectional partial view of a clutch cover assembly according to the invention.

Referring to FIG. 3, the same members as those in FIG. 1 bear the same reference numbers. In FIG. 3, a Belleville spring 8 having a conical shape in a free condition is disposed between a diaphragm spring 5 and an inner radial portion of a clutch cover 2. The spring 8 has an annular shape extending along a clutch rotating direction. The outer peripheral edge of the spring 8 is pressed to and supported by corners formed between the clutch cover 2 and stud pins 3. The inner peripheral edge of the spring 8 is pressed to the spring 5 and forces the spring 5 in a compressing direction.

Figure 2:
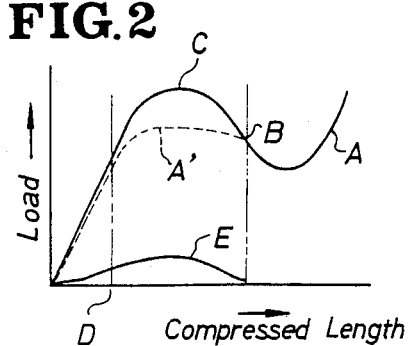
FIG. 2 is a graph showing the relationship between load and compressed length of a diaphragm spring.

The spring 8 has such a characteristic that the forcing load against the spring 5 changes as shown by solid line E in FIG. 2 in accordance with the change of the compressed length of the spring 5. Consequently, the force loaded to the pressure plate 7 by the diaphragm spring 5 changes as shown by broken line A', whereby the pressing force against the disc 6 does not substantially increase to an excess value over long use of the clutch.

Figure 4:
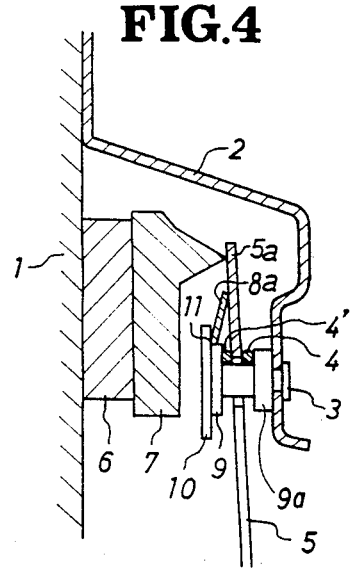
FIG. 4 is a partial schematic sectional view of a clutch cover assembly of another embodiment of the invention.

Referring to FIG. 4, the structure shown is similar in some respect to that in FIG. 3, and thus the same members bear the same reference numbers. The following mechanisms are different. Each stud pin 3 is provided with a flange 10 at its flywheel side end and a flange 9 between the flange 10 and a wire ring 4'. The flange 9 is provided for supporting the wire ring 4' which functions as a fulcrum of the diaphragm spring 5. The flange 10 has a larger diameter than the flange 9 and forms a spring seat 11. A Belleville spring 8a annularly extending along the clutch rotating direction is disposed between the spring seat 11 and the diaphragm spring 5. The spring 8a forces a portion of the spring 5 radially outside the ring 4' so that the spring 8a may compress the spring 5.

In this embodiment in FIG. 4, the same effect can be achieved as that in FIG. 3.

In the embodiments in FIG. 3 and FIG. 4, plural thicknesses of springs 8 or 8a may be employed for increasing the force exerted against the spring 5. Although, one thick spring 8 or 8a may be employed instead of plural thicknesses of the springs 8 or 8a for increasing the spring force, the plural thicknesses of the springs 8 or 8a have long durability and are preferable, because they slide on each other during compression to prevent the stress and strain which occurs with use of one thick spring 8 or 8a. Both of the embodiments shown in FIGS. 3 and 4 may be employed in one clutch. Namely, springs 8 and 8a may be disposed radially inside and outside the rings 4 and 4', respectively in one clutch. As stated above, the various springs 8 and 8a may be combined to more sufficiently prevent the excess pressing force of the diaphragm spring 5.

According to the invention, as detailed hereinabove, the clutch cover assembly comprises: clutch cover 2; diaphragm spring 5 supported by the fulcrum means of the clutch cover 2 for forcing the pressure plate 7; and Belleville springs means including one or more spring 8 or 8a disposed between the diaphragm spring 5 and spring seat means of the clutch cover 2 such as the stud pins 3 in FIG. 4 or the inner portion of the cover 2 in FIG. 3, so that the Belleville spring means may force and compress the diaphragm spring 5. Therefore, the pressing force of the diaphragm spring 5 does not substantially increase to an excess value over long use of the clutch, and thus, overly sufficient strength is not required in a transmission mechanism and a differential mechanism of the vehicle being possible, resulting in lightening of the vehicle. Also, the pedal force for operating the clutch pedal does not increase during the long use, and the operating feel of the clutch pedal is improved.

Figure 5:
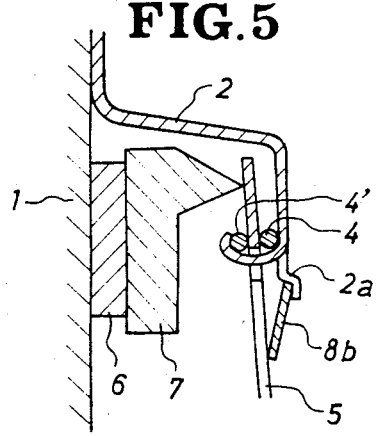
FIG. 5 is a schematic sectional partial view of a clutch cover assembly of still another embodiment of the invention.
Figure 3A:
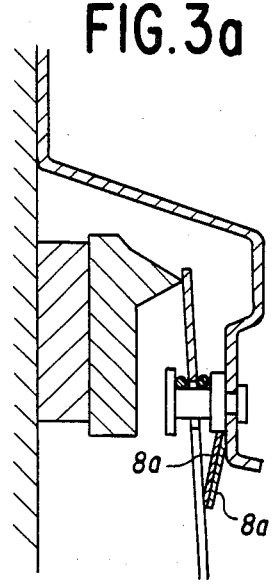
FIG. 3a is a view similar to FIG. 3 but showing another embodiment thereof.
Figure 4A:
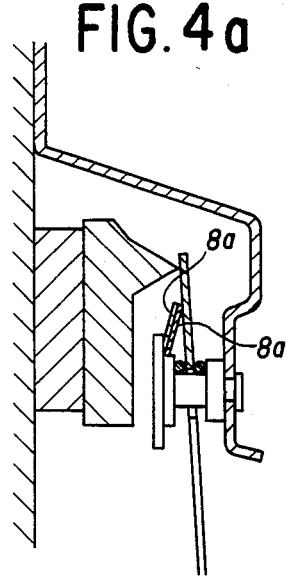
FIG. 4a is a view similar to FIG. 4 but showing another embodiment thereof.
Figure 5A:
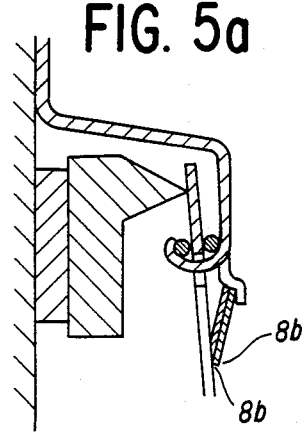
FIG. 5a is a view similar to FIG. 5 but showing another embodiment thereof.

The present invention may be employed in a clutch as shown in FIG. 5. Referring to FIG. 5, bent and inwardly curved portions and stepped portions 2a are formed in an inner peripheral portion of a clutch cover 2. The inwardly curved portions are used for supporting wire rings 4 and 4' instead of the conventional stud pins. A Belleville spring 8b forcing and compressing a diaphragm spring 5 is disposed between the stepped portions 2a and the diaphragm spring 8b.

The structure shown in FIG. 5 can achieve the same effect as those shown in FIGS. 3 and 4.

Although the invention has been described in its preferred forms with a certain degree of particularity, it is understood that variation of these preferred forms can be made, in their details of construction and the combination and arrangements of their parts, without departing from the scope of the invention as defined by the following claims.

What is claimed is:

1. A clutch cover assembly comprising a flywheel, a clutch cover mounted on said flywheel, a pressure plate disposed between said fly wheel and said cover, a clutch disc disposed between said flywheel and said pressure plate, a diaphragm spring supported by fulcrum means on said clutch cover for forcing said pressure plate toward said flywheel to grip said clutch disc between said flywheel and said pressure plate when said diaphragm spring is biased in a first direction about said fulcrum, means for moving said diaphragm spring in a reverse direction about said fulcrum to release said force on said pressure plate and said grip of said clutch disc between said flywheel and said pressure plate, and Belleville spring means in biasing engagement at one edge thereof adjacent said fulcrum means on said clutch cover and at another edge thereof with said diaphragm spring and applying a resilient force to said diaphragm spring along a line extending circumferentially around said diaphragm spring and spaced from said fulcrum means.

2. The clutch cover assembly of claim 1 wherein said Belleville spring means is disposed radially outside the fulcrum means and engages said diaphragm spring at the pressure plate side of said diaphragm spring.

3. The clutch cover assembly of claim 2 wherein said Belleville spring means comprises plural thicknesses of Belleville springs.

4. The clutch cover assembly of claim 1, wherein said Belleville spring means comprises plural thicknesses of Belleville springs.

5. The clutch cover assembly of claim 1 wherein said Belleville spring means comprises plural Belleville springs disposed radially outside said fulcrum means, and engage said diaphragm spring at the pressure plate side of said diaphragm spring.

6. A clutch cover assembly comprising a flywheel, a clutch cover mounted on said flywheel, a pressure plate disposed between said flywheel and said cover, a clutch disc disposed between said flywheel and said pressure plate, a diaphragm spring supported by fulcrum means on said clutch cover for forcing said pressure plate toward said flywheel to grip said clutch disc between said flywheel and said pressure plate when said diaphragm spring is biased in a first direction about said fulcrum, means for moving said diaphragm spring in a reverse direction about said fulcrum to release said force on said pressure plate and said grip of said clutch disc between said flywheel and said pressure plate, and Belleville spring means in biasing engagement at one edge thereof adjacent said fulcrum means on said clutch cover and at another edge thereof with said diaphragm spring and applying a resilient force to said diaphragm spring along a line extending circumferentially around said diaphragm spring and spaced from said fulcrum means, said fulcrum means comprising a plurality of stud pins mounted on and extending inwardly of said clutch cover towards said pressure plate, said diaphragm spring being pivoted on said stud pins and supported thereupon by a pair of wire springs disposed on front and rear sides of the diaphragm spring, respectively, between end flanges of said stud pins, said Belleville spring being in said biasing engagement at said one of its edges with said stud pins.

7. A clutch assembly comprising a flywheel, a clutch cover mounted on said flywheel, a pressure plate disposed between said flywheel and said cover, a clutch disc disposed between said flywheel and said pressure plate, a diaphragm spring supported by fulcrum means on said clutch cover for forcing said pressure plate toward said flywheel to grip said clutch disc between said flywheel and said pressure plate when said diaphragm spring is biased in a first direction about said fulcrum, means for moving said diaphragm spring in a reverse direction about said fulcrum to release said force on said pressure plate and grip of said clutch disc between said flywheel and said pressure plate, and Belleville spring means in biasing engagement at one edge thereof adjacent said fulcrum means on said clutch cover and at another edge thereof with said diaphragm spring and applying a resilient force to said diaphragm spring along a line extending circumferentially around said diaphragm spring and spaced from said fulcrum means, said fulcrum means comprising inwardly bent portions of an inner peripheral portion of said clutch cover extending toward said pressure plate, said diaphragm spring being pivoted on said inwardly bent portions and supported thereupon by a pair of wire springs disposed on front and rear sides of said diaphragm spring, respectively, between an inner face of said clutch cover and radially outwardly extending end portions of said inwardly bent portions, said Belleville spring means being in said biasing engagement at said one of its edges with said inner peripheral portion of said clutch cover.

8. A clutch cover assembly comprising a flywheel, a clutch cover mounted on said flywheel, a pressure plate disposed between said flywheel and said cover, a clutch disc disposed between said flywheel and said pressure plate, a diaphragm spring supported by fulcrum means on said clutch cover for forcing said pressure plate toward said flywheel to grip said clutch disc between said flywheel and said pressure plate when said diaphragm spring based in a first direction about said fulcrum, means for moving said diaphragm spring in a reverse direction about said fulcrum to release said force on said pressure plate and said grip of said clutch disc between said flywheel and said pressure plate, and Belleville spring means in biasing engagement at one edge thereof adjacent said fulcrum means on said clutch cover and at another edge thereof with said diaphragm spring and applying a resilient force to said diaphragm spring along a line extending circumferentially around said diaphragm spring and spaced from said fulcrum means, said Belleville spring means comprising plural Belleville springs disposed radially inside said fulcrum means.

* * * * *